United States Patent [19]

Miyoshi et al.

[11] Patent Number: 4,849,149

[45] Date of Patent: Jul. 18, 1989

[54] PROCESS FOR PRODUCING PNEUMATIC TIRE CORDS

[75] Inventors: Shoji Miyoshi, Osaka; Ryuichi Nomura, Ashiya, both of Japan

[73] Assignee: Toyo Rubber Industry Co., Ltd., Osaka, Japan

[21] Appl. No.: 41,301

[22] Filed: Apr. 22, 1987

Related U.S. Application Data

[60] Division of Ser. No. 744,896, Jun. 17, 1985, Pat. No. 4,715,418, which is a continuation-in-part of Ser. No. 620,523, Jun. 12, 1984, abandoned, which is a continuation of Ser. No. 354,517, Mar. 3, 1982, abandoned.

[30] Foreign Application Priority Data

Mar. 4, 1981 [JP] Japan ................................. 56-30646

[51] Int. Cl.$^4$ ............................................. D01D 5/12
[52] U.S. Cl. ................................ 264/210.5; 264/210.7
[58] Field of Search .................... 156/110.1; 152/451, 152/527, 548, 556; 57/902, 237; 264/210.7, 177.19, 210.8, 211.15, 290.5, 502, 210.5, 235; 528/309.1

[56] References Cited

U.S. PATENT DOCUMENTS

| | | | |
|---|---|---|---|
| 3,216,187 | 11/1965 | Chantry et al. | 152/451 X |
| 3,665,994 | 5/1972 | Kovac et al. | 152/451 |
| 3,838,561 | 10/1974 | Munting | 57/902 X |
| 3,854,515 | 12/1974 | Takemura et al. | 57/902 X |
| 4,101,525 | 7/1978 | Davis et al. | 264/290.5 X |
| 4,134,882 | 1/1979 | Frankfort et al. | 264/210.8 X |
| 4,195,052 | 3/1980 | Davis et al. | 264/210.8 X |
| 4,414,169 | 11/1983 | McClary | 264/210.8 X |

*Primary Examiner*—Raymond Hoch
*Attorney, Agent, or Firm*—Staas & Halsey

[57] ABSTRACT

A process for producing a pneumatic tire having high uniformity with a carcass ply formed of polyester cord, including the steps of: (a) spinning polyester at a tension at the solidifying point of melt polyester between $1.5 \times 10^7$ and $7.5 \times 10^7$ dyne/cm$^2$; (b) drawing the polyester into a filament at a draw ration of 2.0 to 3.0; (c) twisting a polyester filament at a twist coefficient of from 800 to 2,500; and then (d) heat treating the filament so that the dimension unstabilizing factor is 8.5 or less. The polyester filament is made of polyester having an ethylene terephthalate component of at least 85 mol % and a high degree of polymerization such that the intrinsic viscosity is at least 0.8, and the ratio of the birefringence of the surface portion to that of the central portion in the polyester filament is from 1.03/1 to 1.15/1; the twist coefficient is represented by $T \times \sqrt{D}$ (wherein T is the average value of the numbers of turn of the single twist and final twist per 10 cam of cord, and D is the denier of the cord); and the dimension unstabilizing factor is defined as the sum of the elongation (%) at a load of 2.3 g/d and the thermal shrinkage (%) when heated at 105° V. in dry air for 30 minutes.

4 Claims, No Drawings

PROCESS FOR PRODUCING PNEUMATIC TIRE CORDS

This applicatoin is a divisional of co-pending Application Ser. No. 744,896 filed June 17, 1985, now U.S. Pat. No. 4,715,418 which was a continuation-in-part application of co-pending Application Ser. No. 620,523 filed June 12, 1984 now abandoned which was a continuation of then pending Application Ser. No. 354,517 filed March 3, 1982, now abandoned.

BACKGROUND OF THE INVENTION

The present invention relates to a process for producing pneumatic tires having high uniformity.

As is well known, cords formed by twisting multifilaments of rayon, nylon, polyester or the like, or steel wires are used as reinforcing materials for pneumatic tires to be used on a car, and these cords are coated with rubber to provide the carcass plies of the tire.

Tires produced using nylon cords, however, have the problem that when a car with such tires thereon is left standing for a long period of time, a so-called flat spot, i.e., a deformation due to load, is formed in the tires, which leads to an uncomfortable ride at the initial stage of driving the car after sitting. Also, rayon cords have the problem that they have poor strength, and steel cords have the problem that their weight per unit strength is large relative to other types of cords.

On the other hand, polyester cords are free from the foregoing problems and, therefore, they have gained increasingly wider use. However, with extension and improvement of roads and high speed driving, some problems have become apparent in tires comprising polyester cords, such as poor tire uniformity. Thus, it would be very desirable, with respect to carcass plies composed of polyester cord, to provide a process for producing improved dimensional stability and tire uniformity of polyester cord tires without degrading fatigue resistance.

When using tires composed of carcass plies of polyester cords, so-called inflation growth occurs, i.e., the cord is stretched by tension, thus resulting in expansion of the tire. When the inflation growth occurs, the tread rubber and side wall rubber are also stretched. This leads to a reduction in the abrasion resistance and cracking resistance of the tire. In order to prevent inflation growth, it is desirable to reduce the elongation under load of the polyester cord.

Radial tires, in general, are built as follows:

Cord fabrics are coated with rubber and cut in a direction perpendicular to the length of the cords. These cut fabrics are joined with the cords overlapping in a parallel direction to provide a continuous band by overlapping from 1 to 10 end cords of overlapping pieces of fabric. These bands are wrapped once around a tire building drum, cut a few cm longer than the circumference of the drum and joined along the cords of the wrapped band by overlapping from 1 to 5 end cords of the band, so that the band is formed into a cylindrical carcass ply. The carcass ply is contacted with the bead assemblies on the bead portion of the carcass and the edges of the ply are folded around the bead assemblies. Then, the diameter of the carcass ply is increased while reducing the distance between both bead portions and the carcass ply is shaped into a toroidal form. On the surface of the carcass ply are then superposed a belt ply, tread rubber and side wall rubber to form a "green tire" (an unvulcanized tire is called a green tire). The green tire is placed in a mold and vulcanized by heating both the internal and external surfaces of the tire.

During vulcanizing, the internal cavity of the tire is pressurized with steam or hot water pressure, so that the cords are stretched, and then the vulcanized tire is removed from the mold and cooled while applying post inflation pressure in order to prevent shrinkage of the cords. The above-described process of production is similarly applicable to the production of bias tires.

The stiffness of the joined area of the carcass ply of the tire thus composed is higher than other areas of the carcass ply. Furthermore, if the arrangement of cords and cord angles is not uniform, the areas having a high stiffness may be less extended in the shaping of the carcass ply into the toroidal form than other areas. This amplifies the difference in stiffness between the joined areas and the other areas. Such local unevenness in stiffness of the carcass ply brings about an inequality in tension exerted on the cord during post inflation, and therefore an unevenness in the elongation of the cord occurs. Also, since the temperatures of all portions of the mold are not even (because the thickness of the rubber is not even), the temperature distribution in the tire is not always uniform and, during the vulcanizing process thermal shrinkage of the cord occurs unevenly. This unevenness in the thermal shrinkage, in combination with the local unevenness in stiffness of the carcass ply, cause inequality in the elongation of the cord during post inflation. This inequality in the elongation of the cord amplifies the local unevenness in stiffness of the tire.

When a car with the above-described tires having unevenness in stiffness is driven, abnormal vibration occurs, since the degree of deformation changes periodically. This abnormal vibration leads to an uncomfortable ride. If the unevenness increases, the car swings periodically and becomes unstable. The above-described unevenness formed in the tire during the production thereof is due to the high thermal shrinkage of conventional polyester cords. It is, therefore, desired that the polyester cord be made to have a low thermal shrinkage.

The dimensional stability of the cords is represented by the reciprocal of a dimension unstabilizing factor, which is the sum of the elongation (%) at a load of 2.3 g/d and the thermal shrinkage (%) when heated in dry air for 30 minutes. When elongation at a specific load is increased, the thermal shrinkage is decreased. For this reason, low thermal shrinkage and low elongation under specific load are, in general, not compatible with each other and bear an inverse relationship in a conventional polyester cord. For example, the dimension unstabilizing factor of a cord prepared by twisting two 1,500 denier yarns of polyethylene terephthalate (intrinsic viscosity 0.9) at a twist coefficient of 2,190 is within the range of from 9.0 to 9.5. Even though the degree of elongation at load is reduced by changing the heat treating conditions, the thermal shrinkage is increased, and thus the dimension unstabilizing factor remains unchanged.

In order to produce tires having high uniformity, polyester cords in which both the elongation under load and the thermal shrinkage are small, i.e., the dimension unstabilizing factor is small, are required. Previously, in order to reduce the dimension unstabilizing factor, the cord was subject to a heat treatment for a long period of time, or made from polyester having a relatively low viscosity of polymerization, i.e., an intrinsic viscosity of 0.8 or less, or the twist coefficient of the cord was made lower than cord intended for general use. However, the strength and fatigue resistance of the cord prepared in such a manner were lower than cord intended for general use and, therefore the overall practical utility of the tire cord was inferior.

SUMMARY OF THE INVENTION

As a result of extensive studies on the relation between the degree of crystallite orientation of a polyester cord having a high degree of polymerization and the dimensional stability of the tire, it has been found that cords produced by a process resulting in filaments in which the central portion and the surface portion are different with respect to birefringence have good dimensional stability, and that tires having the carcass portion formed of such cords have good dimensional stability and are free from the above-described problems.

Thus, the present invention is directed to a process for producing a pneumatic tire having high uniformity with a carcass ply made of polyester cords, comprising the steps of: preparing polyester filaments having a tension at the solidifying point of the melted polymer during the spinning step of the filament between $1.5 \times 10^7$ and $7.5 \times 10^7$ dyne/cm$^2$; twisting these polyester filaments which also have an ethylene terephthalate component of at least 85 mol % and a high degree of polymerization such that the intrinsic viscosity is greater than 0.8, and the ratio of the birefringence of the surface portion to that of the central portion is from 1.03/1 to 1.15/1, wherein the twist coefficient K is represented by equation:

$$K = T \times \sqrt{D}$$

, T being the average value betwen the number of turns of the single twist and the number of turns of the final twist, each being per 10 cm, and D is a denier of the cord; and heattreating the polyester cord so that the dimension unstabilizing factor defined as the sum of the elongation (%) at a load of 2.3 g/d and the thermal shrinkage (%) when heated at 105° C. in dry air for 30 minutes is 8.5 or less.

DETAILED DESCRIPTION OF THE PREFERRED EMBODIMENTS

The filament to be used to form cord for the invention is made of polyester having an ethylene terephthalate component of at least 85 mol %. A preferred example of such a polyester is polyethylene terephthalate. In addition, copolymerization polyesters containing 15 mol % or less of other components, such as ethylene isophthalate and ethylene benzoate, can be used. The polyester as used herein is also a polyester having a high degree of polymerization such that the intrinsic viscosity as determined at 25° C. with orthochlorophenol as a solvent is greater than 0.8. When the intrinsic viscosity is 0.8 or less cords having a small dimension unstabilizing factor and good dimensional stability, but poor strength and fatigue resistance, can be obtained, and therefor, tires formed of such cords are inferior in durability.

After the melt polyester of a high degree of polymerization is extruded from the spinnret and quickly cooled, the polyester is wound at a tension at the solidifying point of the melt polyester between $1.5 \times 10^7$ and $7.5 \times 10^7$ dyne/cm$^2$ and at a speed of 1,000 to 3,000 m/minute.

Since the tension at the solidifying point is large, the molecules of the polyester are slightly oriented during the spinning step. Cords obtained by pre-orientation followed by orientation during the drawing step, have better dimensional stability as compared with the conventional cords obtained by using only orientation during the drawing step, without pre-orientation.

When the melted polyester is solidified, the surface portion of the filament is cooled faster than the core portion of the filament and becomes a solid, while the core portion is still in a melted state. Thus, large tension is applied thereto, and the orientation of the molecules becomes large.

When the tension at the solidifying point is smaller than $1.5 \times 10^7$ dyne/cm$^2$, the orientation of the molecules is small and results in an inferior dimensional stability. When the tension at the solidifying point is larger than $7.5 \times 10^7$ dyne/cm$^2$, the draw ratio at the succeeding drawing step cannot be made large.

During spinning of the melt polyester of a high degree of polymerization, and during cooling, if the polyester is drawn with a relatively large tension, the degree of orientation of the molecular chain axis in the direction of the fiber axis is changed along the fiber in a radial direction, and the birefringence of the surface portion of the fiber is larger than that of the central portion. This is in contrast to the previously used techniques, wherein drawing was carried out as a second step, separate from the first step of spinning and cooling.

In order to prevent the orientation of molecules at the core portion of the fiber from being remarkably smaller than at the surface portion thereof, the size of the fiber is limited in the range of 2 to 10 deniers and, thereby, the temperature difference between the surface portion and the core portion of the fiber becomes small.

According to this process, since the fiber is drawn in the spinning step, the draw ratio at the drawing step is smaller than conventional and is preferably from 2.0 to 3.0.

In the invention, filaments are used in which the ratio of the birefringence of the surface portion to that of the central portion is from 1.03/1 to 1.15/1. When the ratio is less than 1.03/1, the dimension unstabilizing factor is increased, resulting in a reduction of the uniformity of the tire. On the other hand, when the ratio is above 1.15/1, the average orientation is relatively lower, and the strength as a tire cord is reduced.

The thickness of the filament is preferably from 1.5 to 15 denier.

The twist coefficient, K, for forming cords by twisting the above filaments, is represented by $T \times \sqrt{D}$, wherein T is the average value of the number of turns of the single twist of a plurality of filaments into a strand and the number of turns of final twist of a plurality of strands into a cord, each being per 10 cm of the cord, and D is the denier of the cord. The twist coefficient K is within the range of from 800 to 2,500, and preferably from 2,300 to 2,300. When the twist coefficient is less than 800, the fatigue resistance is small, and when it is above 2,500, the elongation at load is undesirably increased, leading to a reduction in the uniformity of the tire due to inflation growth.

The above prepared cord is, after being dipped in a latexbased adhesive solution and dried, subjected to a heattreatment in order to increase the adhesiveness thereof to the rubber. Preferably the heat treatment is performed at a temperature of from 220° to 250° C. for a period of from 1 to 3 minutes, and the conditions for the heat treatment are chosen so that the dimension unstabilizing factor is 8.5 or less. In general, as the temperature of the heat treatment is increased and the period of the heat treatment is lengthened, the dimension unstabilizing factor tends to be reduced.

The thus produced cords are used for the production of tires in a conventional manner.

The pneumatic tire obtained by the invention has excellent abrasion resistance and anticracking properties, exhibits good uniformity and provides a comfortable ride. Furthermore, the hysterisis loss reulting from repeated deformation and expansion due to the internal pressure of the tire and compression by the ground is reduced. Thus the generation of heat in the interior of the tire is reduced and the rolling resistance is reduced.

The following examples are given to illustrate the invention in greater detail.

EXAMPLE I

Polyethylene terephthalate melted at 305° C. was extruded from a spinnret and then cooled and solidified by cold wind of 50 cm/sec at 25° C. Then, by controlling the winding speed at 1,200 m/minute and the tension at the solidifying point at $2.5 \times 10^7$ dyne/cm$^2$, a fiber was obtained. The resulting fiber was drawn three times with the total draw ratio of 2.8 to obtain a filament.

That is, cords (1,500 denier/2) were produced by spinning and drawing polyethylene terephthalate having a high degree of polymerization and having an intrinsic viscosity of 0.9 under such conditions that the degree of crystallite orientation at the surface portion of the resulting filament was different from that at the central portion, and the thusly formed cords were used to provide 2 carcass plies. Using the carcass plies thus formed, a tubeless tire having a size of 6.45-13 was produced. The cord property of the tubeless tire and the performance of the tire are shown in Table 1.

Comparative Examples 1 to 3 were performed in the same manner as above except that the cord properties were changed, and the results are also shown in Table 1.

TABLE 1

|  | Example | Comparative Example | | |
| --- | --- | --- | --- | --- |
|  | 1 | 1 | 2 | 3 |
| Intrinsic Viscosity | 0.9 | 0.6 | 0.9 | 0.9 |
| Birefringence | | | | |
| Surface Portion × 10$^3$ | 191 | 190 | 192 | 192 |
| Central Portion × 10$^3$ | 180 | 188 | 190 | 188 |
| Ratio | 1.06 | 1.01 | 1.01 | 1.02 |
| Twisting Coefficient (K) | 2190 | 2190 | 1643 | 2190 |
| Elongation at 2.3 g/d Load (%) | 4.9 | 4.6 | 4.4 | 5.1 |
| Thermal Shrinkage in 150° C. Dry Air (%) | 2.1 | 2.7 | 3.0 | 4.3 |
| Dimension Unstabilizing Factor (%) | 7.0 | 7.3 | 7.4 | 9.4 |
| Fatigue Resistance Index of Cord | 100 | 50 | 70 | 100 |
| Uniformity of the Tire (Mark) | 5 | 4 | 3 | 2 |
| Durability Index of Tire | 105 | 65 | 60 | 100 |

In Table 1, the fatigue resistance of cord was tested according to JIS-L1017-63 "Testing Method for Chemical Fiber Cords", Japanese Industrial Standards; the fatigue resistance was indicated in the percentage of the tensile strength after the accelerated fatigue to the original strength, where the accelerated fatigue is done under the conditions of an elongation of 5%, a compression ratio of 13% and at a disc revolution rotation of 2,500 rpm. The uniformity of each tire was tested according to JASO-C607-74 "Test Procedures for Automobile Tire Uniformity" of the Japanese Automobile Standard Organization; a tire of inflation pressure of 2 kg/cm$^2$ was pressed onto a test wheel of outer diameter of 854.1 mm at a load of 366 kg and a revolution speed at 60 rpm, and the magnitude in change of force in the direction of the radius of the tire was measured. The average measurement values were graduated into five grades, with Mark 5 being the best in uniformity. The durability of each tire was tested according to U.S. Car Safety Standard FMVSS109, i.e., a tire of inflation pressure of 1.7 kg/cm$^2$ was pressed against a test wheel at a speed of 80 km/hour while applying a predetermined load at predetermined intervals until tire failure occurred. The results were indicated with the value of Comparative Example 3 being taken as 100. In Comparative Example 3, the conventional cord was used in which there was almost no difference in birefringence between the central portion and the surface portion in the polyethylene terephthalate of high degree of polymerization.

It can be seen from Table 1 that:

the cord of high birefringence ratio as used in Example 1 was equal in fatigue resistance to the cord of Comparative Example 3, but had a dimension unstabilizing factor lower than that of Comparative Example 3, and the tire formed of the cord of Example 1 was excellent in uniformity and durability; and with the cord of Comparative Example 1, as produced using polyethylene terephthalate of a low degree of polymerization and having an intrinsic viscosity of 0.6, and with the cord of Comparative Example 2, relatively reduced in the twist coefficient, the dimension unstabilizing factor is reduced in each case, but the fatigue resistance is also reduced, and therefore, the tires produced using the cords are inferior in uniformity and durability compared to the cord of Example 1.

EXAMPLES 2 AND 3

Polyethylene terephthalate melted at 310° C. was extruded from a spinnret and then cooled and solidified by cold wind of 70 cm/sec at 20° C. Then, by controlling the winding speed at 2,500 m/minute and the tension at the solidifying point at $3.9 \times 10^7$ dyne/cm$^2$, a fiber was obtained. The resulting fiber was drawn three times with the total draw ratio of 2.2 to obtain a filament.

Polyethylene terephthalate having high degree of polymerization was processed under such conditions that the degree of crystallite orientation was different between the central portion and the surface portion of the resulting filament. Two 1,500 denier filaments were twisted to form a cord (1,500 denier/2). These cords were formed into monoply radial carcass tires having a size of 155SR13.

Comparative Examples 4 to 6 were conducted in the same manner as above except that the cord properties were changed. The cord properties of the tires and the tire performances for Examples 2 and 3 and Comparative Examples 4 through 6 are shown in Table 2.

TABLE 2

| | Example | | Comparative Example | | |
|---|---|---|---|---|---|
| | 2 | 3 | 4 | 5 | 6 |
| Intrinsic Viscosity | 0.9 | 0.9 | 0.7 | 0.9 | 0.9 |
| Birefringence | | | | | |
| Surface Portion × 10³ | 191 | 191 | 190 | 192 | 192 |
| Central Portion × 10³ | 174 | 174 | 188 | 188 | 188 |
| Ratio | 1.10 | 1.10 | 1.01 | 1.02 | 1.02 |
| Twisting Coefficient (K) | 2190 | 1100 | 2190 | 1643 | 2190 |
| Elongation at Specific Load (%) | 3.6 | 4.3 | 4.9 | 4.5 | 5.4 |
| Thermal Shrinkage in 150° C. Dry Air (%) | 2.8 | 2.3 | 2.7 | 2.8 | 4.1 |
| Dimension Unstabilizing Factor (%) | 6.4 | 6.6 | 7.6 | 7.3 | 9.5 |
| Unevenness in Side Wall (Mark) | 3 | 3 | 2 | 2 | 1 |
| Durability of Tire (Index) | 120 | 100 | 80 | 70 | 100 |
| Heat Generation of Tire (°C.) | 84 | 83 | 88 | 86 | 88 |
| Tire Rolling Resistance (Index) | 98 | 98 | 100 | 99 | 100 |

In Table 2, the undulation unevenness in the side wall was examined by measuring the depth of a groove-like dent formed in a radial direction on the side wall of each tire with an inflation pressure of 2.2 kg/cm² gauge (G) and was graded into 3 grades. Particularly, when the tire was not dented, the undulation of the tire was marked 3; when the tire was dented to a depth of 3 mm or less, undulation of the tire was marked 2; and when dented to a depth of more than 3 mm, undulation was marked 1. The heat generation was measured as follows: after running under the maximum load conditions in the above-described tire durability test according to the aforementioned FMVSS 109, a needle-like thermistor thermometer was inserted into a hole which had been formed in the side and central portions of the tire tread to determine the temperature in each hole. The heat generation was indicated by measuring the temperature at the center portion and a side portion. The tire rolling resistance was determined according to SAE-J 1296, published in Nov. 1979, by the U.S. Automobile Engineer Association. A tire with inflation pressure of 1.7 kg/cm² (G) was pressed against a test wheel running at a surface speed of 80 km/hr, under the standard load conditions as defined in JIS4202, and the counterforce exerted on the tire's rotary axis was measured. The value was indicated with the counterforce in Comparative Example 6 being taken as 100.

It can be seen from Table 2 that:

(1) in Examples 2 and 3, in which the ratio of birefringence was 1.10 in each case, although the twist coefficients were different, the dimension unstabilizing factors were small and the tires exhibited performance nearly equal to each other;

(2) in the Comparative Examples 5 and 6 in which the polyethylene terephthalate was processed in such a manner that there was no difference in birefringence between the central portion and the surface portion of the filament, the dimension unstabilizing factor varied depending on the twist coefficient; and (3) in Examples 2 and 3, since no unevenness was observed in the side wall, the tire durability was equal to or better than that of Comparative Example 6, and the tire heat generation and tire rolling resistance were better than those of Comparative Examples 4 through 6.

EXAMPLE 4

The characteristics of cords produced according to the present invention and various conventional cords were determined as follows. Conventional cords and cords made in accordance with the present invention as recited by the present claims were compared under the same conditions as described in Example 1, Run #1, of U.S. Pat. No. 3,929,180 issued to KAWASE et al. (Columns 7–10). The tire cord material samples tested are explained below.

(1) Tire Cord Material Samples

The following Table 3 represents the various tire cord material samples compared.

TABLE 3

| Sample No. of Cord | 11[1] | 12 | 21 | 22 | 31 | 32 |
|---|---|---|---|---|---|---|
| Winding Speed of Filament (m/min.) | less than 1000 | less than 1000 | less than 1000 | less than 1000 | 2300 | 1200 |
| Tension at Solidifying Point (dyne/cm²) | — | — | — | — | 3.4 × 10⁷ | 2.3 × 10⁷ |
| Polyethylene Terephthalate mol % | 100 | 100 | 100 | 100 | 100 | 100 |
| Intrinsic Viscosity [η] | 0.86 | 0.88 | 0.69 | 0.65 | 0.82 | 0.89 |
| Cord Structure | 1000D/2 | 1000D/2 | 1000D/2 | 1000D/2 | 1000D/2 | 1000D/2 |
| Twist Density (T/10 cm) Cable × Single | 40 × 40 | 40 × 40 | 40 × 40 | 40 × 40 | 40 × 40 | 40 × 40 |
| Twisting Coefficient (K-value) | 1788 | 1788 | 1788 | 1788 | 1788 | 1788 |

[1]11, 12-"Conventional" Type; 21, 22-Low Intrinsic Type, KAWASE et al.; 32, 32-The Present Invention Type (POY). POY is the abbreviation of Partially Oriented Yarn.

Table 3 sets out the six tire cord material samples used in this Example.

The first conventional pair (number "11" and "12") has "high" intrinsic viscosity and a twist coefficient of 1788; however, one was made of tetron and the other was made of polyester. Tetron and Polyester are both polyethylene terephthalate cords. Tetron, however, is a brand name of the Japanese tire company known as Teijin Limited, whereas the polyester cord used was produced by a company called Toyobo Petcord Co., Ltd.

In comparison, a second conventional pair (numbered "21" and "22") has "low" intrinsic viscosity, and a twist coefficient of 1788. Again, one was made of tetron and the other was made of polyester.

Finally, a third pair of tire cords was produced according to the present invention and has a relatively "high" intrinsic viscosity and a twist coefficient of 1788; one sample was made of tetron and the other was made of polyester.

Each of the six tire cord material samples 11, 12, 21, 22, 31 and 32 had the same polyethylene terephthalate vol % (100), cord structure (1000D/2) and twist density (number of twists 10 cm = 40×40).

|  | (2) Treating Conditions | | |
|---|---|---|---|
|  |  | Dry | Extension | Set |
| (a) Temperature (°C.) | Normal Conditions | 150 | 240 | 240 |
|  | Excess Conditions | 150 | 255 | 255 |
| (b) Time (Minutes) | Normal | 4 | 1 | 1 |
| (c) Stretching (%) | Normal | Selected appropriately | |
|  | Excess | 0 | 4.5 | 0 |

(3) MEASURING METHOD

(a) Intrinsic Viscosity

Each sample was dissolved in a mixed solvent comprising 75% by weight of p-chlorophenol and 25% by weight of tetrachloroethane. The resulting solution was used to measure intrinsic viscosity with an Ostwald-Fenske capillary viscometer at 30° C.

(b) Birefringence

The refractive index (n//) of the fiber in the direction parallel to the fiber axis and the refractive index (n/⊥) of the fiber in the direction perpendicular to the fiber axis were measured with an interference microscope manufactured by KarlZeiss Co. The birefringence, i.e., $\Delta n$ = mean molecular orientation was then determined from the following formula:

$$\Delta n = n// - n\perp$$

(c) Twist Coefficient

The twist coefficient was measured by the following formula:

$$T \times \sqrt{D}$$

, where T is the average number of twists per 10 cm in a single cable and D is a nominal denier. "Nominal" denier is the manufacturer's suggested denier.

(d) Strength

The strength was measured at a stretching speed of 300 mm/min and at a distance between clamps of 25 cm ccording to JIS (Japanese Industrial Standard) L1017.

(e) Elongation at 2.3 g/D

Elongation at 4.5 kgf was also measured according to JIS L1017.

(f) Dry Heat Shrinkage Factor

The free shrinkage factor after heating at 150° C. for 30 min. was used, as measure similarly by JIS L1017.

(g) Modulus (g/D)

$$\frac{L}{\overline{D} \times 0.02}$$

, where L is a load (g) at an elongation of 1%, and $\overline{D}$ is the actual denier. "Actual" denier is the denier value actually calculated from the applicant's measurement of length and weight, as compared with the manufacturer's nominal denier.

(h) Dimension Unstabilizing Factor

This value was measured as the sum of the Dry Heat Shrinkage factor and the Elongation at 2.3 g/D, both cited above in (f) and (e), respectively. Each of the samples 11, 12, 21, 22, 31, and 32 were tested, as was a cord "12 excess," which was treated under the "excess" conditions discussed above.

(i) Fatigue Resistance

This "resistance" was measured as the tensile strength retention factor (%) after a fatigue test for 69 hours with a Goodrich Disk Fatigue Tester (2500 rpm) under testing conditions of 5% stretching and 13% compression.

(j) Tire Uniformity

To achieve the "uniformity" value, the radial force variation of a tire inflated at a pressure of 2.0 kg/cm² while under an added load of 360 kg was measured in accordance with Japanese Automobile Standard JASO.C 607 published by the Society of Automobile Engineers of Japan, the Standard being equivalent to SAE.J332a published by the Society of Automobile Engineers Inc. The average value of radial force variation in 20 tires of each sample was indicated.

(k) Unevenness in Sidewall

In order to determine this value, the depth of undulation in the radial direction was measured on the sidewall of the tires inflated by the pressure of 2.2 kg/cm², using a depth dial gauge having the minimum division of 0.01 mm scale. The average value of undulation in 20 tires of each sample was indicated.

(l) Tire Endurance

Tire endurance was first measured by the following method, in accordance with "standard" conditions of the Tire Endurance Test Procedure set out in Federal Motor Vehicle Safety Standards No. 109 of 49 C.F.R. §571 (1983).

|  | Within standard provisions | | | | In excess of standard provisions |
|---|---|---|---|---|---|
| Load (kg) | 40 | 427 | 475 | 570 | 665 |
| Period (hours) | 4 | 6 | 24 | 24 | (continues until occurrence of trouble) |
| Running Time (hrs) | 4 | 10 | 34 | 58 | |

As noted above, the same test was then conducted using conditions in excess of the standard provisions.

The average value of tire endurance in 2 tires of each sample was measured.

The following Table 4 provides a summary of the tire uniformity, unevenness in sidewall and tire endurance test data.

TABLE 4

Comparative Tire Tests

| Cord Sample | 11 | 21 | 31 |
|---|---|---|---|
| TIRE UNIFORMITY (R.F.V.) | | | |
| Number of tires tested | 20 | 20 | 20 |
| Average of measurements(kg) | 7.5 | 6.3 | 6.1 |
| UNEVENNESS IN SIDEWALL | | | |
| Number of tires tested | 20 | 20 | 20 |
| Average of measurements (mm) | 0.12 | 0.04 | 0.01 |
| TIRE ENDURANCE | | | |
| Number of tires tested | 2 | 2 | 2 |
| Running Time (hrs) | 60.3 | 40.3 | 62.7 |

TEST TIRE

| | |
|---|---|
| Size 165 SR 13 | Radial Tire for Passenger Car |
| Carcass | Polyester Cords 2 Ply |
| Belt | Steel Cords 2 Ply |

The experimental results of the samples obtained and tested are shown in the following Table 5.

TABLE 5

Cord Characteristics

| Sample No. | | Conventional | | Low Intrinsic | | This Invention (POY) | |
|---|---|---|---|---|---|---|---|
| | | 11 | 12 | 21 | 22 | 31 | 32 |
| Intrinsic Viscosity | | 0.86 | 0.88 | 0.69 | 0.65 | 0.82 | 0.89 |
| Birefringence | Surface | 1.90 | 0.198 | 0.196 | 0.190 | 0.189 | 0.194 |
| | Center | 1.88 | 0.198 | 0.198 | 0.188 | 0.179 | 0.181 |
| | Ratio | 1.01 | 1.00 | 0.99 | 1.01 | 1.06 | 1.07 |
| Twist T/10 cm | Cable × Single | 40 × 40 | 40 × 40 | 40 × 40 | 40 × 40 | 40 × 40 | 40 × 40 |
| Twist Coefficient | | 1788 | 1788 | 1788 | 1788 | 1788 | 1788 |
| Filament Number | | 250 | 190 | 190 | 190 | 250 | 240 |
| Filament diameter (mm) | | 0.021 | 0.023 | 0.023 | 0.023 | 0.021 | 0.021 |
| Tensile Strength (kg) | | 15.5 | 15.7 | 14.3 | 14.5 | 14.9 | 15.0 |
| | (Heat Set) | Normal** | Normal | Excess*** | Normal | Normal | Normal | Normal |
| Elongation at break (%)* | | 16.7 | 15.0 | 11.4 | 15.3 | 14.0 | 14.6 | 14.8 |
| Shrinkage (%) | | 4.3 | 4.3 | 4.9 | 4.4 | 4.3 | 3.8 | 4.2 |
| Elongation 2.3 g/D (%) | | 4.4 | 4.6 | 3.4 | 3.1 | 3.3 | 3.2 | 3.0 |
| Dimension Unstabilizing Factor | | 8.7 | 8.9 | 8.3 | 7.5 | 7.6 | 7.0 | 7.2 |
| Tensile Strength (kg) | | 15.4 | 15.6 | 12.5 | 14.2 | 14.0 | 14.8 | 14.9 |
| Modulus at 2% Elong. (g/d) | | 52 | 52 | 69 | | 70 | | 73 |
| Fatigue TS Retention (%) | | 80 | 81 | 50 | | 70 | 85 | 86 |

*The elongation at break values above are grater than the Vock Reference for the reasons described in Section B above.
**"Normal" indicates the normal treating conditions set out above in Section C.
***"Excess" indicates the excess treating conditions set out above in Section C.

As seen from Table 5, the "conventional" ("high" intrinsic viscosity) type cord is characterized by larger dimension unstabilizing factors than either the "low" intrinsic viscosity type cord or the cord of the present invention (POY type).

POY type cords have small dimension unstabilizing factors because of their manufacturing conditions, such as high speed spinning and a low drawing ratio. These conditions lead to more uniformity and lower orientation of the amorphous parts in the central area of the filament than in "conventional" cords, thus producing low shrinkage and high modulus properties.

Even if the conventional cords are treated under the "excess" treating conditions discussed above, their overall tire characteristics do not equal the cord characteristics of either the "low" intrinsic viscosity samples or the present invention (POY type) samples. As a matter of fact, even the "excesstreated" "conventional cords" deteriorate in tensile strength and in fatigue resistance relative to the "low" intrinsic viscosity cords of the present invention.

As also shown in Table 5, the "high" intrinsic viscosity "conventional" cords can neither simultaneously meet the conditions of 70 g/D of modulus and 4.3% dry heat shrinkage under normal or excess treatment conditions.

On the other hand, the "low" intrinsic viscosity cords, approximate the present invention's (POY type) cords in respect to dimension unstabilizing factors but are inferior compared with the present invention's anti-fatigue ability.

Accordingly, the cords made in accordance with the present invention are structurally and functionally different from the "conventional" cords at least in respect to ratio of birefringence and dimension unstabilizing factor. The present invention differs particularly from the "low" intrinsic viscosity cords in respect of polymerization degree as represented by intrinsic viscosity and ratio of birefringence and fatigue resistance.

While the invention has been described in detail and with reference to specific embodiments thereof, it will be apparent to one skilled in the art that various changes and modifications can be made therein without departing from the spirit and scope thereof.

We claim:

1. A process for producing a pneumatic tire cord having excellent uniformity with a carcass ply made of polyester cord, comprising the following steps:
   (a) extruding melt polyester;
   (b) spinning the melt polyester into a filament at a tension at the solidifying point of the melt polyester between $1.5 \times 10^7$ and $7.5 \times 10^7$ dyne/cm$^2$ and at a speed of 1000 to 3000 m/min.;
   (c) cooling a surface portion of the filament faster than a core portion, such that the surface portion becomes a solid while the core is still in a melted state;
   (d) while the core is still in a melted state, drawing the filament at a total draw ratio of 2.0 to 3.0;
   (e) twisting a plurality of the polyester filaments into a strand and twisting a plurality of said strands into a cord,
   wherein each of the filaments has an ethylene terephthalate component of at least 85 mol %, and a high degree of polymerization such that the intrinsic viscosity is greater than 0.8, and a ratio of the birefringence of the surface portion to that of the core from 1.03/1 to 1.15/1, and the cord has a twist coefficient in the range of from 800 to 2,500, and wherein, said twist coefficient is equal to T/x/D, T being the average value between the number of turns of the first twist of the plurality of filaments into a strand and the number of turns of a final twist of the plurality of strands into the cord, each being per 10 cm of cord, and D being the denier of the cord; and (f) heat treating the polyester cord so that the dimension unstabiliing factor is 8.5 or less, wherein, the dimension unstabilizing factor is defined as the sum of the elongation (%) at a load of 2.3 g/d and the thermal shrinkage (%) when heated at 150° C. in dry air for 30 minutes.

2. The process as recited in claim 1, wherein the polyester is polyethylene terephthalate.

3. The process as recited in claim 1, wherein the twist coefficient ranges from 1,300 to 2,300.

4. The process as recited in claim 2, wherein the twist coefficient ranges from 1,300 to 2,300.

* * * * *

UNITED STATES PATENT AND TRADEMARK OFFICE
CERTIFICATE OF CORRECTION

PATENT NO. : 4,849,149
DATED : Jul. 18, 1989
INVENTOR(S) : Miyoshi et al.

It is certified that error appears in the above-identified patent and that said Letters Patent is hereby corrected as shown below:

Title page:

[57] Abstract
Line 22, delete "V." and insert --C--.

Col. 10

Line 5, delete "$\frac{L}{D \times 0.02}$" and insert --$\frac{L}{\overline{D} \times 0.02}$--.

Signed and Sealed this

Twenty-ninth Day of May, 1990

Attest:

HARRY F. MANBECK, JR.

Attesting Officer

Commissioner of Patents and Trademarks